United States Patent
Inala et al.

(10) Patent No.: US 6,442,590 B1
(45) Date of Patent: *Aug. 27, 2002

(54) METHOD AND APPARATUS FOR A SITE-SENSITIVE INTERACTIVE CHAT NETWORK

(75) Inventors: Suman Kumar Inala, Santa Clara; P Venkat Rangan, San Diego, both of CA (US)

(73) Assignee: Yodlee.com, Inc., Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,171

(22) Filed: May 27, 1999

(51) Int. Cl.$^7$ .................................................. G06F 13/00
(52) U.S. Cl. ........................ 709/204; 709/203; 709/217
(58) Field of Search ................................. 709/200, 201, 709/203, 204, 205, 206, 217, 218, 219, 227, 228, 229

(56) References Cited

U.S. PATENT DOCUMENTS

| | | | | |
|---|---|---|---|---|
| 5,828,839 A | * | 10/1998 | Moncreiff | 709/204 |
| 5,905,865 A | * | 5/1999 | Palmer et al. | 725/112 |
| 5,990,887 A | * | 11/1999 | Redpath et al. | 345/330 |
| 6,029,195 A | * | 2/2000 | Herz | 709/219 |
| 6,061,716 A | * | 5/2000 | Moncreiff | 709/204 |
| 6,081,830 A | * | 6/2000 | Schindler | 709/204 |
| 6,172,677 B1 | * | 1/2001 | Stautner et al. | 345/352 |
| 6,263,501 B1 | * | 1/2001 | Schein et al. | 725/39 |
| 6,212,548 B1 | * | 4/2001 | DeSimone et al. | 709/204 |
| 6,223,292 B1 | * | 4/2001 | Dean et al. | 713/202 |
| 6,226,648 B1 | * | 5/2001 | Appleman et al. | 707/107 |
| 6,240,443 B1 | * | 5/2001 | Suzuki et al. | 709/204 |

* cited by examiner

*Primary Examiner*—Moustafa M. Meky
(74) *Attorney, Agent, or Firm*—Central Coast Patent Agency, Inc.; Donald R. Boys (57) ABSTRACT

In a site-sensitive Internet service system enhanced client browsers report URLs to an Internet-connected service-control server, which informs clients of other clients visiting common URLs, and organizes and enables chat sessions among simultaneous visitors to common Internet sites. In some cases the server activity, including chat sessions is transparent to hosts of the WEB sites visited. In others the WEB sites, through cooperation with the service-control server, control information streaming to clients, including chat sessions. Information streamed may include banner ads enabled as hyperlinks. In a further embodiment the service-control server maintains and reports statistics based on site visitation reported by clients.

38 Claims, 4 Drawing Sheets

METHOD AND APPARATUS FOR A SITE-SENSITIVE INTERACTIVE CHAT NETWORK

FIELD OF THE INVENTION

The present invention is in the field of Internet navigation and pertains more particularly to methods and apparatus for providing URL-sensitive interactive chat capability.

BACKGROUND OF THE INVENTION

The information superhighway known as the Internet is by far the largest source of publicly-available information about virtually any subject. Information from all over the world may be obtained by anyone operating an Internet-connected appliance such as a personal computer. Information available on the Internet is provided to requesting clients by use of a variety of multimedia and interactive technologies. For example, e-mail technology allows advertisers selling from the Internet to send information to consumers about their products or services. Multi-media options for presenting product or service related material to consumers include the use of audio and video technologies. Object modeling is yet another technology used for configuring WEB-based orders, or the like. Still other technologies include interactive banner displays, on-line order forms, interactive guides, and so on.

It is quite clear to the skilled artisan that the Internet is certainly not limited to electronic commerce. That is, many organizations, both government and private maintain WEB sites for dissemination of information and for communication with interested persons. Electronic commerce, (e-commerce) however is arguably the fastest-growing sector of the Internet. The present invention also has particular application to e-commerce systems and activities. For this and other reasons, many of the embodiments and examples used in the present specification to describe embodiments of the present invention are e-commerce-related examples. This should not be taken as a limitation, however, as embodiments of the invention may be applied to al kinds of WEB activity.

The types of technologies used for advertising and facilitating the purchase of a product or service over the Internet depend largely on the type of product or service represented. For example, a car-sales site may use surround-video technology to attract buyers, and object modeling to configure a purchase. A music site may provide audio and audio/video clips for review and an on-line order form for purchase. There are many varying categories of products or services that are discernable and obtainable through interaction with a wide array of various technologies, which are generally known in the art and provided either directly (by the advertisers) or indirectly (by authors of the individual technologies).

Many of the different types of interactive WEB-based technologies used to interact for the purpose of obtaining more information about a product or service are provided in the form of downloaded software programs or modules that configure themselves, or may be configured to a WEB-browser application. Many of these applications are simple controls transparent to a client, are automatically downloaded and invoked only when a client is visiting a WEB page and needs them. Still others are provided as standalone applications or programs that must be purchased, installed via download or other method (CD or Floppy), and invoked separately from a WEB-browser when interacting on the Internet. In general, there has been a push in the software and information industries to integrate Internet technologies to desktop software applications in more seamless and transparent ways.

Advertising and selling over the Internet is becoming more and more commonplace as facilitating technologies are developed and refined. However, in current art, a prospective buyer or interested party to an Ad featuring a WEB-based service or product must operate basically alone when gathering information or making a purchase on-line. Help programs or frequently asked questions (FAQ's) are made available to assist prospective buyers at the time of or before a purchase, however, these conventions often fall short of satisfying a consumer's concerns, as they are invariably skewed toward the seller's point of view. Sometimes a prospective consumer is more confused after reading a FAQ or consulting an on-line help desk than he or she was at the beginning of an ordering process. Moreover, the competitive nature of many WEB-based businesses or services precludes the provision of any information about alternative products or services that may be available to consumers. As described above, many, if not most companies at the present time maintain a commercial WEB site. Frequently these sites offer products and services. Sometimes only information, and guides whereby a person may reach the company by another route than the Internet (phone, mail) to make a purchase. Further to company-hosted sites, many companies advertise on other host's WEB sites. These advertisements are typically banner-type ads that are created using hypertext-markup-language (HTML) and posted through agreement by the advertiser and the host of the page. The ad is typically a hyperlink, wherein selection in a Browser application invokes a URL for the advertiser's particular site.

Typically, if a WEB page is commercial, a host will not accept competitive banner ads that may take traffic away from his or her page as described above. A consumer then, is usually limited to non-competitive advertisement from the particular WEB site that he or she is visiting unless the particular page is dedicated to product review. Most product or service comparisons must be made by virtue of the client navigating to another URL that offers a similar product or service creating more work for a consumer, and often leading to frustration.

One Internet technology that is used both for provision of information, and often, purely for entertainment purposes is interactive chat capability. This capability allows clients who are connected to the Internet to engage in collective sharing of information and direct communication with one another. In order to engage in Internet chat, chat software enabling this type of interactive communication must be installed on each participant's computer system either as a standalone software program or as a "plug-in" to a WEB browser.

Chats or chat sessions, as they are termed, are usually scheduled ahead, and are typically hosted by an entity doing business on the WEB or an entity who is otherwise authorized to provide the session. Many chat sessions are limited to a particular subject matter in which all of the participants are hopefully interested. Often a chat is "open" (no particular subject) and attracts persons meeting for general conversation. In some cases, chat sessions are scheduled and associated with WEB sites displaying information such as news articles, political opinions, and so on, that are central to the topic of the session. Sessions may be provided by schedule, or they may be ongoing (continually available). In still other cases, individuals may set up a private chat session and invite certain others to participate in the session. A venue of advertisement that the present inventor believes has been overlooked in the industry is an ability to advertise to on-line chat patrons participating in a chat session.

In prior art situations chat capability is practiced in such as after-market customer care, technical group assistance, forums for hobbyists, political discussion, fan clubs, and private session (invite only). Servers hosted by companies providing the chat software, or by companies hosting a WEB site using the chat software provide the means for the multi-party connections. In some cases, multimedia options other than simple keyboard chat such as I-phone, blackboard drawing, voice messaging, file transfer, or the like are made available to participants having the appropriate software capability for facilitating such media. For the most part, however, session participants are able to interact with each other only by virtue of the commonality that they have the appropriate or supported chat software installed on their computers.

Often, consumers may want to hear the opinions of others or third parties not necessarily connected to a business before committing to a purchase. Also, consumers appreciate an ability to make a comparison, or to look at alternative options before committing to any one product or service. In many instances, consumers are visiting a WEB site to browse only and do not intend to purchase anything from the site even though they may be interested in certain products or services offered by the site. In still other instances, consumers are visiting a non-commercial site about a subject they are interested in and perhaps have purchased or will purchase items related to that subject from any available source. Therefore, an opportunity exists for advertisers to make use of chat technology as a new venue for advertisement.

Individuals wishing to chat purely for entertainment or educational purposes are limited to visiting known (advertised) chat sessions, or must create and host their own chat sessions. Often, it is desired by these individuals to invite many of their on-line friends from their chat program address lists. Generally, they must send messages to those friends and invite them into a session. Moreover, if an individual whishes to invite other individuals to a created chat session about a WEB page he or she is visiting, URL's must be sent to each individual along with a request to navigate to the WEB page and join in. Such individuals are, however, limited to chatting with those persons who are notified and accept by navigating to the page and joining the session. Persons who have the same chat software capability and are already visiting the same WEB page cannot typically be detected or included in the chat session.

What is clearly needed is a method and apparatus that enables real-time chat capability that is URL-sensitive in real time such that individuals visiting a URL may be detected and offered an opportunity to engage in chat with other individuals visiting the same URL. Such a method and apparatus would provide a new means for participants to communicate with people of common interests as well as providing a new venue for advertisers to send ads and other material to consumers through third party ad streaming.

SUMMARY OF THE INVENTION

In a preferred embodiment of the present invention a site-sensitive service system in a wide-area network (WAN) is provided, comprising an enhanced browser extension executing on a first client platform and accessing the WAN; and a service-control server in the WAN. The enhanced browser extension opens a first communication link to a first WAN-connected site and at least a second communication link to the service-control server, and reports the address of the first WAN-connected site to the service-control server, and wherein the service-control server streams information to the client platform based on the address of the first WAN-connected site. In preferred embodiments the WAN is the well-known Internet network.

Also in a preferred embodiment information streamed to the first client platform comprises identities of additional clients concurrently connected to the first WAN-connected site. Further, in preferred embodiments the service-control server initiates a chat session among client platforms having a connection to the first WAN-connected site as reported by respective enhanced browser extensions at the client platforms. The server may be connected to multiple chat servers for organization and control of chat sessions.

In some cases the information streamed to the client platform is transparent to a host of the first WAN-connected site, and the information streamed may include advertisements hosted by entities other than a host of the first WAN-connected site. In other cases the information streamed to the client platform is controlled by a host of the first WAN-connected site, and the server may initiate a chat session among client platforms having a connection to the first WAN-connected site as reported by respective enhanced browser extensions at the client platforms, the chat session also controlled by the host of the first WAN-connected site..

In many embodiments the service-control server maintains statistics on sites visited by clients, and makes the statistics available to clients and to hosts of such as WEB pages.

In another aspect of the invention a method for providing selected information by a service-control server to client platforms in a wide-area-network (WAN) is provided, comprising steps of (a) reporting browsing destinations to the service-control server by enhanced browser extensions at the client platforms; (b) listing in the service-control server client platforms accessing common WAN destinations; and (c) streaming information to client platforms based on the lists of client platforms accessing the common destinations. Preferably the WA is the Internet. Further the information may include identities of additional client platforms concurrently connected to the common destinations. In many cases the server can initiate a chat session among the client platforms having a common connection to a WAN destination as reported by respective enhanced browser extensions at the client platforms.

In many cases the information streamed to the client platform is transparent to a host of the common destination, and the information streamed to the client platform includes advertisements hosted by entities other than the host of the common destination. In other cases information streamed to the client platform may be controlled by a host of a common destination. In these embodiments chat sessions are also controlled by the host of the common destination.

In the various embodiments of the invention, disclosed in enabling detail below, for the first time chat capability is seamlessly integrated with Internet browsing, and browsing clients visiting a common Internet site can communicate with one another transparently to the host of the common site. Further, a new dimension in advertising is provided, allowing advertisers to stream ads to clients visiting competitors WEB sites, and other capabilities.

DESCRIPTION OF THE PREFERRED EMBODIMENTS

According to a preferred embodiment of the present invention, a unique service is provided wherein Internet chat capability is site-sensitive and may be integrated with dynamic advertising to provide a site-sensitive advertising venue to multiple consumers. The method and apparatus of the present invention is described in enabling detail below.

Figure 1:
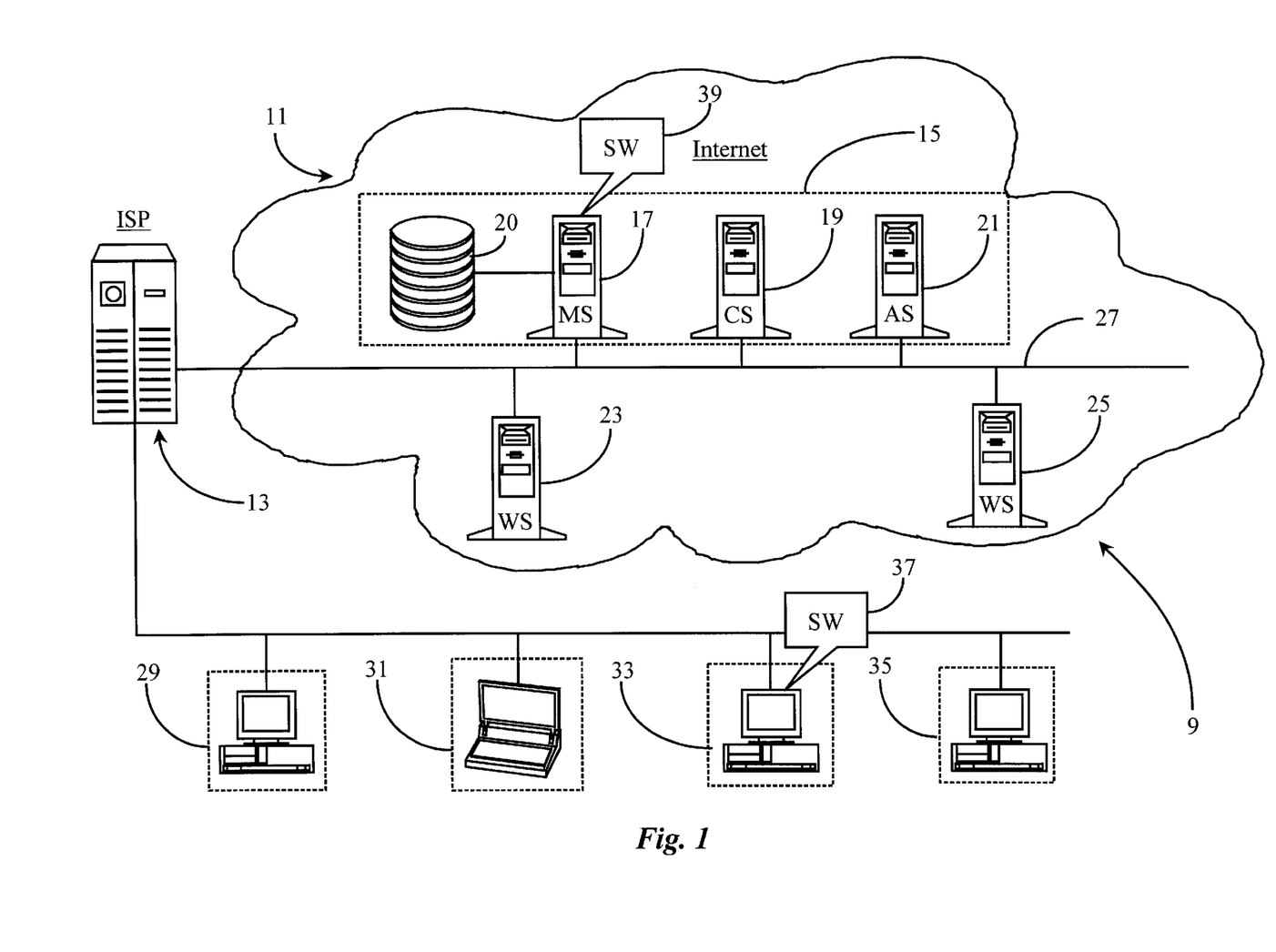
FIG. 1 is a general overview of an integrated chat-advertisement-service network according to an embodiment of the present invention.

FIG. 1 is a general overview of a chat-advertisement-service network 9 according to an embodiment of the present invention. Service network 9 provides a new dimension for chat systems, allowing multiple WEB site visitors to interact directly, and advertisers to provide ads to multiple consumer clients based on current real-time navigation status and, in some cases, profiling of such clients. Service network 9 comprises an Internet network 11, a server architecture 15, and a plurality of subscriber/clients, operating at client premises such as premises 29, 31, 33, and 35.

Internet network 11 may be in some embodiments another type of data network known in the art such as a private or corporate wide-area-network (WAN) without departing from the spirit and scope of the present invention. However, the practice of the present invention is optimized through the large public interface provided through Internet 11. For convenience an Internet-Service-Provider (ISP) 13 is shown as providing Internet-access connectivity between Internet 11 and clients operating at premises 29, 31, 33, and 35 as is known in the art of Internet access, although each of the clients may have separate and unique access.

Server architecture 15 is an example of service architecture in an embodiment of the present invention, and provides means for identifying and monitoring client parameters, enabling multiparty chat-session connections between clients, and provides in some embodiments streamed ads to clients logged into chat-sessions. For example, a main Internet service-control server 17 is provided and adapted to identify clients and monitor client parameters related to navigation activity on the Internet. Such navigational activity is URL-specific such that when a client visits a WEB page (URL) it is reported to server 17 according to predetermined rules. The client extension hooks into whatever extension API the browser supports, which is typically different for different browsers.

There may be more than one main or central server such as server 17 without departing from the spirit and scope of the present invention. For example, an array of interconnected machines may serve as a central or main server by virtue of collective and coordinated function. The inventor deems that one illustrated server 17 is sufficient for the purpose of explaining the present invention. A mass storage repository 20 is provided and connected to server 17. Repository 20 is an on-line storage adapted for storing information about clients such as profile information, subscriber status, credit information, address information, and the like.

A plurality of Internet-connected chat servers, represented herein by one server 19, are provided and adapted to facilitate ongoing chat sessions between clients practicing the present invention. An Internet-connected ad server 21 is provided in some embodiments and adapted to stream ads in a push or pull manner to individual chat sessions taking place in servers 19. Servers 17, 19, and 21 are illustrated as connected to an Internet backbone 27 and may communicate with one another. In one embodiment, additional data lines may also interconnect them if desired for purposes of dedicated bandwidth transmission of data between servers. Moreover, ad server 21 and main server 17 may in many embodiments be one machine. The inventor illustrates these servers separately for the purpose of explaining separate function only and that separate physical machines or one machine may perform the desired functions.

Also connected to Internet backbone 27 are WEB-servers 23 and 25. Servers 23 and 25 are representative of many such servers connected to the Internet and adapted to host WEB pages and the like as is known in the art. In many cases these WEB servers may be associated with ISPs. Main server 17 monitors client navigation associated with server content accessed by clients from standard WEB servers such as 23 and 25 by virtue of the software of the present invention.

Main server 17 has a software application 39 installed thereon and adapted to enable practice of the present invention. Software 39 functions to enable sorting and organization of client data and real-time data associated with client-navigational monitoring, among other functions. Software 39 uses the data to categorize and organize multi-client chat sessions maintained in chat servers such as server 19. The skilled artisan will recognize that these chat sessions are not necessarily hosted in separate servers, and that this architecture is convenient for description. Software 39 may also coordinate other parameters associated with delivering prepared HTML ads to individual chat sessions being held in servers such as server 19. Software 39 may be implemented in whole on server 17 as shown here, or in parts in any combination of servers 17, 19 and 21 as may be desired.

Clients operating at client premises such as premises 29, 31, 33, and 35 use a personal computer or other Internet appliance capable of supporting Interactive chat capability to gain access to service-network 9 through ISP 13 under normal Internet access parameters such as are known in the art. In this embodiment, clients at premises 29, 33, and 35 are operating desktop computers while a client at premise 31 is operating a notebook computer. This variance simply illustrates that other computerized appliances capable of accessing the Internet other than desktop PC's may be used to practice the present invention.

A client software instance 37 is shown installed on a participating PC at client premise 33. It may be assumed that an instance of the same software 37 is installed and operable on participating Internet appliances at premises 29, 31, and 35 as well. Software 37 is, in a preferred embodiment, a client chat-module implemented as a browser plug-in. A client operating in any of illustrated client premises 29–35 may, in practice of the present invention, download an instance of software 37 from any providing server in Internet 11. Once downloaded, software 37 may automatically extract (if compressed) and install itself to the client's WEB browser as a plug-in application enabling site-sensitive chat capability according to embodiments of the present invention. In an alternative embodiment, software 37 may be a chat helper instead of a chat module such that it configures a client's existing chat program to the client's desired WEB browser or browsers and thereby enables the practice of the present invention. This is done by considering other chat networks to be namespaces within the URL namespace.

The inventors intend that the present invention overcome resistance from users who are already using popular chat networks such as IRC, Mirabilis' ICQ, Yahoo pager, etc. Users of these services may want to use the new plug-in according to embodiments of the invention, but may not want to abandon their friends and associates in old networks. By creating a URL namespace in embodiments of the new invention that encompasses existing chat locations, users of the new plug-in may use the new client to transparently enter these other networks without requiring their friends to change.

For example, consider a user who uses IRC to chat on machine www.xbar.com, port 3000. Let's say the central server in the present invention is named chat.yodlee.com. All IRC communication happens under the URL http://chat.yodlee.com/irc/. To use the chat client to do IRC, the user needs only visit the URL http://chat.yodlee.com/irc/www.xbar. com/3000/. This web server would present an IRC chat page, asking the user for their password if the server doesn't already know it. After authentication, the new server logs in to www.xbar.com on behalf of the user. Any input received by the central server will be echoed by the user's homunculus on the machine www.xbar.com. The friends of the user will not need to change anything to continue communicating with the user, and the user may use the new chat client without cutting off any ties. Similarly, all ICQ communication will be conducted similarly under the URL http://chat.yodlee.com/icq/ virtual namespace.

Returning now to FIG. 1, a client operating at a premise such as premise 31, for example, may browse WEB-sites as is typical with a WEB browser application. Such a client, by virtue of software 37, may now elect to enter a chat session created as a result of a plurality of clients participating at a common site (URL) at the same time. Such sessions are created and maintained in a chat server such as server 19 and include any other requesting client or client's that happen to be at the same URL at the same time with just the requirement that they are enabled by virtue of software 37. Pre-prepared ads from server 21 may in some embodiments be streamed to each of many ongoing chat sessions wherein clients may elect to view and interact with such ads. Subscription to service network 9 may be provided through ISP 13, a company hosting architecture 15, or any other controlling entity enabled to provide software 37 and service network 9.

In a preferred embodiment, subscription to service network 9 and download of software 37 is provided free to clients, however, advertisers would pay to use the created venues in chat sessions. In other embodiments, modest fees may be passed on to clients such as professional buyers for companies using the network to optimize effective purchasing of products or services. In this sense, service network 9 may be used as a public service, or a private corporate service network. In some embodiments, service 9 may be operated as a combination of public, private, and corporate enterprise.

It will be apparent to the skilled artisan that architecture 15 may contain many more or fewer servers such as servers 19 and 21 than are illustrated here without departing from the spirit and scope of the present invention. The number of servers will depend on the scope of service network 9. More detail about the software function of the present invention is provided below.

Figure 2:
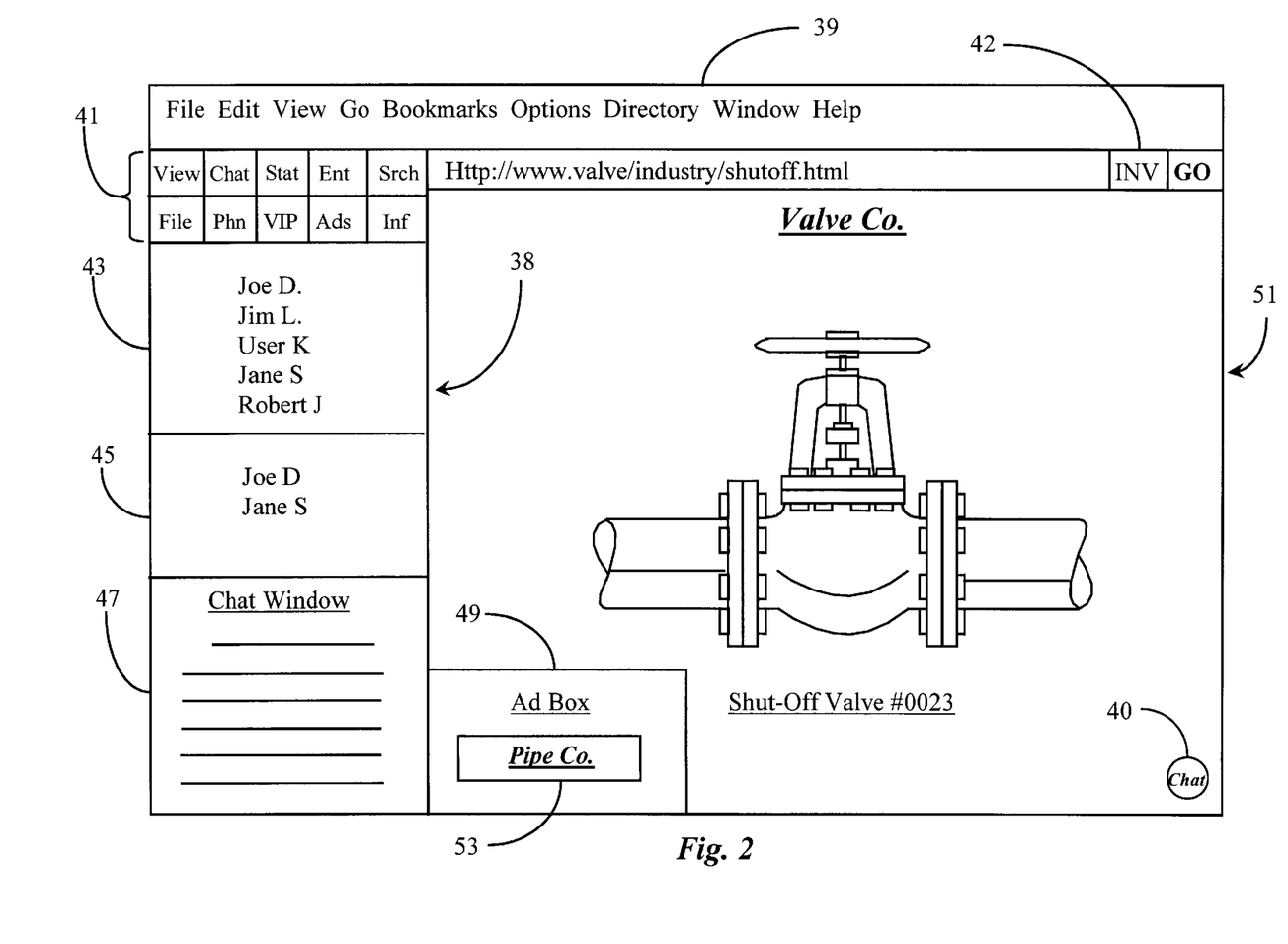
FIG. 2 is a plan view of an exemplary desktop display of a browser enhanced with the software of the present invention according to an embodiment of the present invention.

FIG. 2 is a plan view of an exemplary client interface display produced by a browser enhanced with software 37 of FIG. 1 according to an embodiment of the present invention. It will be apparent to the skilled artisan that this graphic interface may take many different forms within the spirit and scope of the invention, and the form illustrated is merely an example of the many.

The WEB browser producing the interactive interface of FIG. 2 may be any type of navigational software adapted to navigate the Internet or other data networks. In this example, the browser may be a common browser application such as Netscape Navigator™ in any version.

Software 37, when installed and invoked, typically provides a chat icon 40 in the display. The chat icon may take any graphic form, and is interactive as a selectable menu button or the like to invoke additional display related to the interactive extension of the present invention. This initiation link may also take other forms, such as a key code or a menu item.

Selection of icon 40 or equivalent initiation mechanism in the interactive interface provides a sidebar window 38. The interface maintains normal browsing function as illustrated by the standard tool bar. For example, File, Edit, View, Go, Bookmarks, and other standard pull-down browser menus and function buttons are unaffected by software 37. Added functions related to the operation of extension software 37 may in some embodiments be added to existing pull-down menus provided as a normal part of the browser interface. In a preferred embodiment, software 37 uses hypertext transfer protocol (HTTP) to communicate with and receive data from server 17.

In a preferred embodiment two HTTP connections are opened to server 17 for the purpose. One connection is for sending data and one is for receiving data. Software 37 in alternative embodiments may also use other known data transfer technologies as may be known in the art. HTTP is used in order to navigate through proxies without problems. In alternative embodiments alternative protocol may be used, such a raw TCP.

In this example, the browser interface in FIG. 2 is displaying a WEB page hosted by an exemplary company illustrated here as Valve Co. A particular page 51 hosted by Valve Co. is illustrating a shut-off valve #0023, which is being viewed by an operating client such as one at one of premises 29–35 of FIG. 1.

In preferred embodiments of the present invention, when a client invokes extension software 37, which may happen with activation of the browser application by default, connections are opened to server 17, as described briefly above, in addition to any page the client may be viewing. Extension 37 monitors the client's browsing activity and sends notification of any new URL invoked to server 17, where the client (as a subscriber to the inventive service) is known. Software 39 at server 17 lists and groups subscriber/clients according to the URLs the subscriber/clients are accessing. Server 17 thus knows at any point in time exactly which clients may be viewing any one WEB page, and may provide such information to member clients, as well as performing other functions. In some embodiments the service control server can consider two different destinations (URLs) to be the same according to heuristics on the service-control server.

Once software 37 is invoked as illustrated here, a control panel 41 is displayed. Control panel 41 contains additional control features designed to enable or disable certain chat-related function. For example, a view function enables a client to view the parameters of other clients that are currently engaged in viewing the same WEB page 51. A window 43 in this embodiment is provided to display a list of current clients who are visiting. When the current client invoked the URL for WEB page 51 extension 37 notified server 17, which immediately returned parameters for other clients visiting the same page. It will be apparent to the skilled artisan that control panel 41 may also be, for example, a menu bar.

In this example, there are 5 clients engaged in viewing valve page 51 with their interactive extensions 37 activated. Other client parameters may be included in a client list in window 43 such as indication of other communication capability of each client, according to client profiles kept at server 17. Such capabilities may include such as I-phone capability, file transfer capability, videophone capability, whiteboard capability and so on.

In alternative embodiments the alert of other viewer clients at a WEB page and/or an active chat session may be done in other ways. There may be, for example, a number displayed in button 40 for active viewers, or two numbers, one for active viewers and another for clients in a chat session. There are many possible mechanisms.

A chat button in this embodiment provided in control panel 41 allows a client to view a list of other clients viewing valve page 51 who are engaged in active chat, if any. A window 45 provides an area to list such clients. In this example, only 2 of the 5 subscriber/clients viewing valve page 51 are engaged in active chat. In this case, Joe D and Jane S are engaged in chat. A statistics (Stat) button provides a client with additional profile information for each viewable or actively chatting client. Such information is provided voluntarily by each participating subscriber/client and may include phone numbers, place of work, address, title, e-mail address, and so on.

If there are clients viewing the same page but no active chat session, any of the viewing clients may request a chat session, and the others will then be notified by some convention, and may enter a newly activated chat session. If there is a session in progress, any client viewing the page may use an enter (Ent) button to enter an existing chat.

For a chat session a chat dialog box 47 appears allowing text chat with, in this instance, clients Joe D and Jane S. Names (or more general IDs) of clients will, of course, appear and disappear from windows 43 and 45 according to how they operate in the chat environment. For example, if Jane S leaves the chat session but stays at page 51, her name will disappear from window 45, but remain in window 43, and so on. In another embodiment, a client may temporarily leave a chat and return after visiting different WEB pages.

A search (Srch) button in this embodiment is provided in control panel 41, and allows a client to search chat servers such as server 19 of FIG. 1 for other active chat sessions associated with other sites. Search parameters may include searching chats by subject, searching chats by WEB page, searching chats by known client profile, searching chats by size of session, and so on. A dynamic search function such as the one provided above allows quick navigation to ongoing chats that may be more helpful to a client wishing to see certain types of products or services, or perhaps other known clients or friends. An invite function (not shown) may be integrated with the search function such that a client may invite another client to an ongoing chat.

In one embodiment, chat transcripts may be stored for some period of time, as they typically are in conventional chat programs, for the purpose of rendering them searchable. In this case, a history button may be provided that, when invoked, produces a legible transcript of the chosen session. Moreover, by selecting to view the properties of any participating individual, an option for searching only that individual's chat interaction may be provided. Such transcript storage in one embodiment is made available at the service-control server, and cross-indexed for searching facility. It will be apparent to the skilled artisan that storage and indexing, and searchability as well, may be provided in a broad variet of ways, depending on the needs of clients.

Also included in control panel 41 is a file (File) button linking a client to a file transfer application for exchanging data files with other similarly-equipped clients. A phone (Phn) button links a client with any I-phone applications for connecting to another client or clients who are similarly equipped. A VIP button is provided and adapted to invoke any VIP services that may be applicable such as applying a purchase on a credit account without having to use a credit card number, delivering special temporary chat controls, or the like. As the Internet continues to evolve towards a state wherein bandwidth is more widely available, more multimedia options may be practical for chatting such as video chat and so on.

In a preferred embodiment of the present invention, assuming an open chat session associated with a WEB page, and a client jumps to a new WEB destination, the opened chat session remains, rather than being terminated. The termination is at the client's request. In this embodiment, as the client selects to leave an open chat session, that client will then receive visitor parameters for any new destination, and may enter a new chat session.

In one embodiment of the present invention server 17 is enabled to stream advertisements from an ad server 21 into open and active chat sessions. Advertising is subscribed with various companies for the purpose, and is typically related to chat subjects in turn related to WEB pages to which chat sessions are associated. An ad (Ads) button is provided and allows a client to view or to block the ads that may be streamed into a chat session. For example, if a client wishes to view such ads, he clicks on the ads button with conventional pointer technology to open an ad dialog box 49 in which ads such as ad 53 (Pipe Co.) are viewable. Streamed ads may be timed such that a plurality of ads may appear in box 49 one at a time in such as a serial or rotational fashion. In another embodiment, several ads may appear together and remain throughout the chat. The ads are typically banner ads as interactive hyperlinks allowing client selection to initiate navigation to the advertiser's WEB site. In this example ad 53 is for a pipe company that may provide connective piping for valve #0023 or other valves sold by Valve Co. A client may also select to discontinue viewing of the ads.

Ads are, in a preferred embodiment as mentioned above, interactive hyperlinks to WEB pages (URL's) hosted by companies providing the ads. For example, by clicking on a displayed ad such as ad 53 in box 49, a client may be launched to the WEB page where products or services of the ad may be purchased. In one embodiment, an ad may be a link to downloadable information, a live agent connected to the ad, and so on. There are many such possibilities.

In a preferred embodiment a client need not leave a chat or a WEB site he or she is viewing when invoking a URL associated with a streamed ad such as ad 53. Rather, a second browser window may open containing the WEB page of the advertising Company. In this way a client may make comparisons in products or services, see related products or services, and so on without giving up his or her current page or current status in a chat session. If the new site has an ongoing chat associated with it as well, the client may jump to that chat for a period of time and then return to his or her original chat session. Moreover, a client may also leave his or her current chat, and commit to the new chat.

An information (Inf) button is provided in control panel 41 and provides additional information regarding any ads seen in ad box 49 without having to navigate to the WEB page of the ad. For example, ads that are presented in box 49 will be, of course, sized to fit. Perhaps only the company logo and a few descriptive titles will be visible. Therefore, by right clicking on an ad such as ad 53, and then clicking the Information button, more detailed descriptions of products and services may be provided about the particular company sponsoring the ad. Such details may be contained in a pull-down box or separate window. Right clicking on an ad such as ad 53 may hold it in display mode until additional information is obtained. Right clicking again may resume normal ad rotation.

Some prior art chat programs allow a client to find friends and associates who happen to be on-line and then direct them through messaging to navigate to a same WEB page such that they will then be chatting while viewing the same page. However, they must be using the same software and be registered on each other's software.

Integrating a buddy system into a standard WEB browser as part of the plug-in is unique over the above convention in that it is configured to a WEB browser and not a standard chat program. In an embodiment wherein the software plug-in is a chat helper instead of a complete chat program, clients practicing the present invention may be hosting separate and normally non-compatible chat programs. Via use of the helper extension, a client is enabled to send a URL to a friend and invite the friend over to the chat at that URL with automatic navigation and inclusion into the chat even though they are using two different programs. The separate programs are made compatible by the software of the present invention.

Using a virtual name space, a user may operate a conventional chat program and participate in a site-sensitive chat without cutting ties with his other chatting friends on the conventional chat program. This implementation creates a virtual space for all of the user's friends who aren't practicing the present invention. In this way, a user may use a chat program such as the well-known IRC™ program to engage in site-sensitive chat at a URL without losing his chat connection to his friends. Input from communicating friends is directed to the server location and port hosting the name space. An IRC™ chat window would open for the user in addition to his extension 37 of FIG. 2.

Control features included in plug-in 37 are not limited to the variety described herein, but may also include all known features practiced in any chat environment such as whisper, private discussion, use of macros and the like. Automatic updates that are transparent to the user and full support of language differences and e-mail protocols, bidirectional text, and so on.

The inventor intends, that plug-in 37 support all multi-media editing including using thumbnails, voice, and video where bandwidth permits. Similarly, the practice of the present invention may be easily separated between the Internet and such as an Intranet by known address recognition techniques.

The inventor knows of no existing chat service wherein navigational parameters of participating clients are automatically reported to a controlling server for the purpose of creating a chat opportunity around that particular WEB page and wherein ads may be continually streamed to the chat session as long as it exists.

This unique and novel approach provides advertisers with a new avenue for advertising that is not currently available in the art. The created ability for advertising is also unique in that direct presentation may be made to clients who are pre-qualified and already interested in the subject matter of the ads. Clients are similarly afforded a unique level of comfort not available in prior art in that they may converse with other clients of varying experience (in chat). Such clients may obtain among other things, information related to a common subject, help making decisions, assistance in configuring orders or other technical assistance, testimony from others who have already done business with companies providing ads, and so on.

It will be apparent to one with skill in the art that a chat software-plug-in such as software 37 may have more or fewer control features than are illustrated herein without departing from the spirit and scope of the present invention. For example, additional temporary controls may be provided by download to requesting clients who may then use them in conjunction with a chat session. Such controls may allow downloading of configuration models, order forms, sensitive material, or other conventions. Such controls may also be adapted to allow certain chat participants to exert some control over the behavior of other participants as is known in the art.

Ads may also be tailored according to known clients such as VIP clients qualifying with exceptional income or status. For example, if all participants are viewing a marine product page, and a majority of them have exceptional annual incomes, then ads for cabin cruisers may be streamed instead of ads for small skiffs. The inventor intends that this example be construed as exemplary only in function and appearance as a desktop computer or Internet appliance interface. Functionality and appearance of interface 40 and software 37 may vary with different Internet appliances, which may have differing display modes and control capabilities. Typical requirements for an Internet appliance to practice the present inventions are that it has access to the Internet, supports some type of display mode, supports chat software, and supports URL navigational capability.

As registered clients obtain and begin using software 37 of the present invention, it will be apparent that a server architecture will be required that is capable of hosting many chat sessions for limited, possibly short, periods of time with sessions continually closing and new sessions opening based on real-time navigational parameters reported by portions of all clients at any given time. Such a flexible and scalable server architecture is detailed below.

Figure 3:
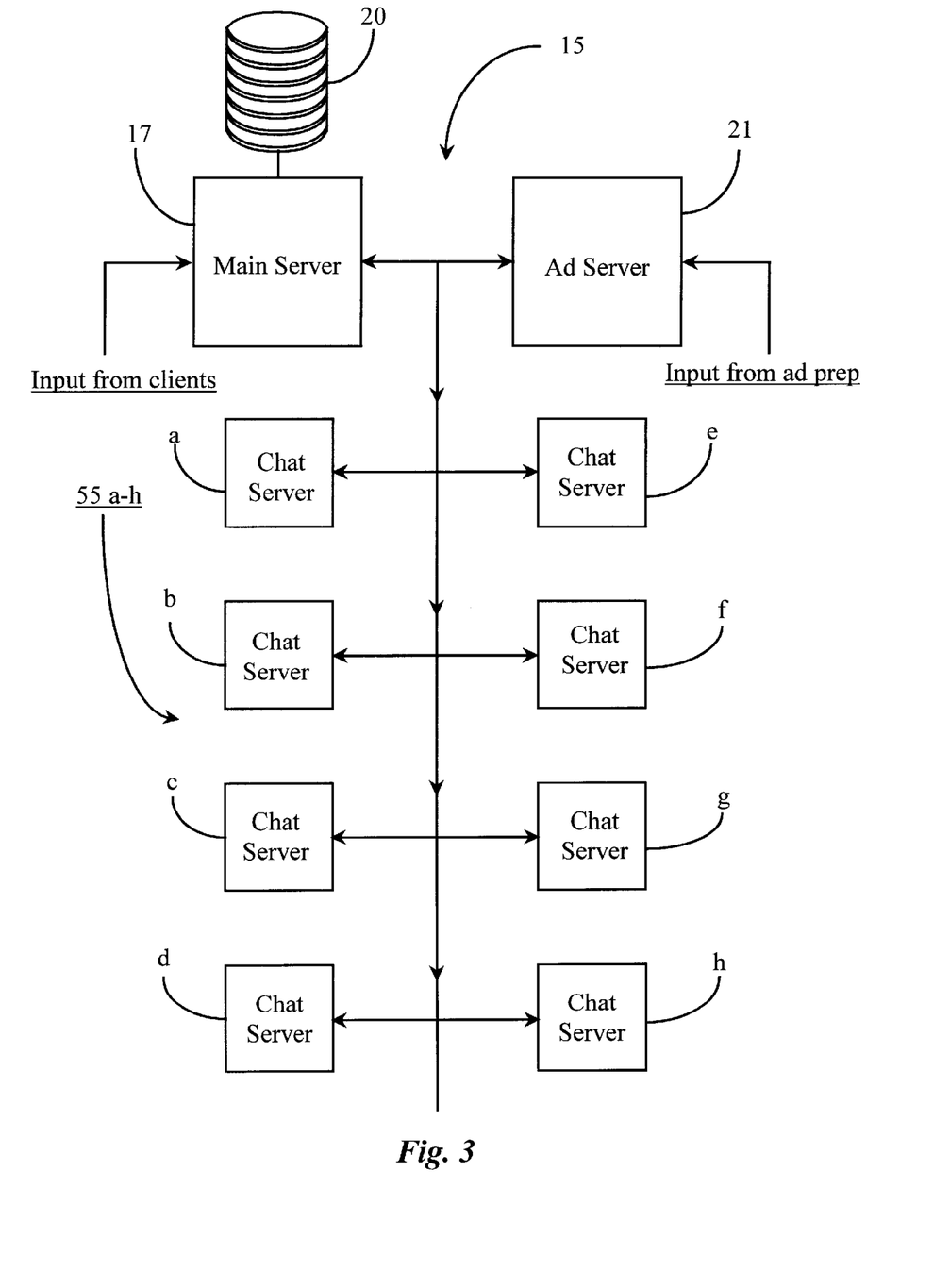
FIG. 3 is a block diagram illustrating chat-ad server architecture according to an embodiment of the present invention.

FIG. 3 is a block diagram illustrating chat-ad server architecture 15 of FIG. 1 according to an embodiment of the present invention. Architecture 15 is adapted to facilitate many thousands of clients who are organized into groups in each of many connected chat servers such as server 19 of FIG. 1. Main server 17, as previously described, is responsible, among other tasks, for receiving data from plug-ins 37 in the field and sending data to plug-ins 37 in the field. Each registered client typically has an IP address and identification indicator. These parameters, along with URL status of each client's browser is used to route the client to one of many chat servers 55a–h, which are analogous to server 19 of FIG. 1. In this sense, server 17 is also used as a high-speed data router capable of assigning sessions in servers 55a–h and routing clients to such created sessions according to session address, which will typically be a URL address. Additional data that is pre-stored in repository 20 may also be used to enhance identification of any client. Such data would be available according to client discretion to others in a same chat session as previously described with reference to FIG. 2.

In this example, all chat parameters are server controlled by server 17 and companies hosting individual URL's are not directly aware of the ongoing chat between clients visiting their WEB pages. Ads are streamed to clients in session from ad server 21, which may include advertisements of a competitive nature to the material on a particular WEB page defining the session.

In another embodiment, companies hosting WEB pages to which clients may browse may also control the chat sessions. In this case, companies use their WEB pages as a launching pad to a related chat room facilitated by architecture 15 wherein different ads from the company may be streamed according to the company's rules. A company's paid individual may also host such a chat session to help with technical problems or questions, and so on. In this case, competitive ads would typically not be streamed to consumers. In this way, companies may set up chat sessions without maintaining servers and other equipment on the Internet, and the companies may control the look and functionality of the chat sessions rather than the client default controls or server controls. Moreover, embedded tags may be provided in such WEB pages that contain certain instruction for server 17 related to chat rules and advertisement parameters.

Typically, all ads whether competitive or not, are preprepared in the form of banner or other interactive ads and stored in server 21 as illustrated by the directional arrow into server 21. Server 21 communicates with server 17 to determine which ads will be streamed to which on-going sessions in servers 55a–h. However, this is not to be construed as a limitation as, ad servers other than the one hosted by the service such a ones associated with company sites, may well be allowed to prepare and stream their own ads.

There are many possible variations for delivering ads to different URL-defined chat sessions. Some of these variations will depend on the competitive nature of the chat session. If server 17 controls all chat parameters transparent to hosts of defining URL's, then ads may well be competitive in nature. For example, ads may adhere to loose categories defined by general subject such as perhaps "computer peripherals". When a chat session defined by, for example, the home-page of Gateway Computers™ opens up in one of servers 55a–h, then ads adhering to the loose category of "computers and peripherals" may be organized and rotated into the chat session. As additional sessions open up that are defined by additional pages provided by Gateway™ the category may narrow somewhat depending on the subject that the new page more clearly falls under such as, perhaps, "computer monitors". At this stage or session everyone is looking at Gateway™ monitors. Ads for monitors provided by competitors and Gateway™ as well may be rotated into the more specific session. (Multi-tiered site sensitive chat).

If the session is site controlled (company hosting visited URL's) then ads are not competitive to the visited site. These ads may include additional information not available on the WEB page, or perhaps ads of affiliates offering complimentary products or services, which may be rotated into such sessions. Likewise, there may be no ads at all. Many sites are non-commercial and may wish to control chats based on subject matter they present to the public through their WEB pages. For example, a private individual may host a bird-watching page and may wish to chat with fellow bird lovers as they visit his page. He may control, or even host the chat session set-up by virtue of server 17 and one of servers 55a–h. If desired, he may request any advertisers he trusts to prepare ads and send them to his chat session for a fee. In this way, he becomes a sales agent for the new advertising agencies. Perhaps getting a small percentage of any commission from any sales resulting from advertisement in his chat sessions.

There are many possible implementations for the method and apparatus of the present invention both site-controlled and server-controlled. The network may be used for competitive advertising (server-controlled), advertising from a same site (site-controlled), or for recreational or educational purpose (no advertising). However, an embodiment wherein competitive advertising is practiced may afford more revenue in order to maintain and expand architecture 15. In other embodiments, one network may provide a combination of all embodiments.

One URL may define a chat. All clients visiting that URL may view and chat with all other consenting client visitors. There are also situations in which one main URL leads by virtue of interaction to many additional URL's presenting more detailed or segregated information that is only generally available from the first URL. As clients progress to additional URLs, available chat sessions will likely become smaller in terms of number of clients. Enterprise rules will dictate the acceptable levels of chat participants in any one URL-defined chat. For example, a minimum number of visitors may be required for a chat session to be created. Similarly, a pre-determined maximum number of clients may define a full chat room. In this case, a second chat room under the same URL may be created and clients may be informed by server 17 that they may enter the new, less-congested room. When a number of clients drops below a pre-determined minimum, an open session may close by rule. In this way, more popular URL's will be more likely to have at least one chat session associated with them.

In one embodiment, a list of top URL's (largest number of clients visiting or chatting at one URL) may be provided to clients by request. Such lists may be made available for many different categories and may be obtained through a search function such as one described in FIG. 2.

In order for streamed ads to adhere to the general subject matter of a URL, a means for at least partial parsing of each URL (WEB page) is provided. This may be accomplished in different ways. In one method, software 37 reports the URL address and a short descriptive summary of it's subject matter parsed from the display at such time a client invokes the page. In another method, software 37 sends a displayable form of the URL and parsing is performed on-line at server 17. Because URL's are not always constant in terms of content, and may even be reassigned to other entities, parsing is required if ads are to be streamed according to subject category.

In an embodiment wherein ads are not streamed, there is no need for URL parsing by software elements of the present invention (client 37 or parent 39) of FIG. 1. Other methods for controlling ads or chat content may be provided through site control implementations. For example, meta-tags, active-X controls or other embedded modules inserted into WEB pages may be picked up by software 37 and reported to software 39 in server 17, which communicates the instruction to ad server 21 for appropriate deployment of ad content, specific decorum, scripted messages, and the like into any designated chat-session window.

In some embodiments wherein competitive ads are streamed, ad server 21 may multicast a same ad schedule to many separate URL-defined sessions. In another embodiment, separate ad packages are bundled in real-time and addressed for broadcast to individual URL sessions in servers 55–h. In this way, many different ad packages may be sent to many differing URL's. It will be apparent to one with skill in the art that the sophistication of advertising to an extremely large number of URL-defined sessions will depend on many factors. These include variation of represented subjects associated with chat sessions, variety of available advertisers, ability to tailor ads and ad packages to specific sessions, and capacity of data lines connecting chat servers 55a–h to facilitate many varying ad packages.

In yet another embodiment, secondary ad servers (not shown) are connected one each to each chat server such as servers 55a–h. In this way, bulk ads may be delivered to secondary ad servers for organization and redistribution to individual sessions according to enterprise rules. Pre-created ads are preferably provided by advertisers. However, a convention such as a task force of ad workers may be provided to create and package the ads for the advertisers. There are many rigid and flexible embodiments that may be created.

Figure 4:
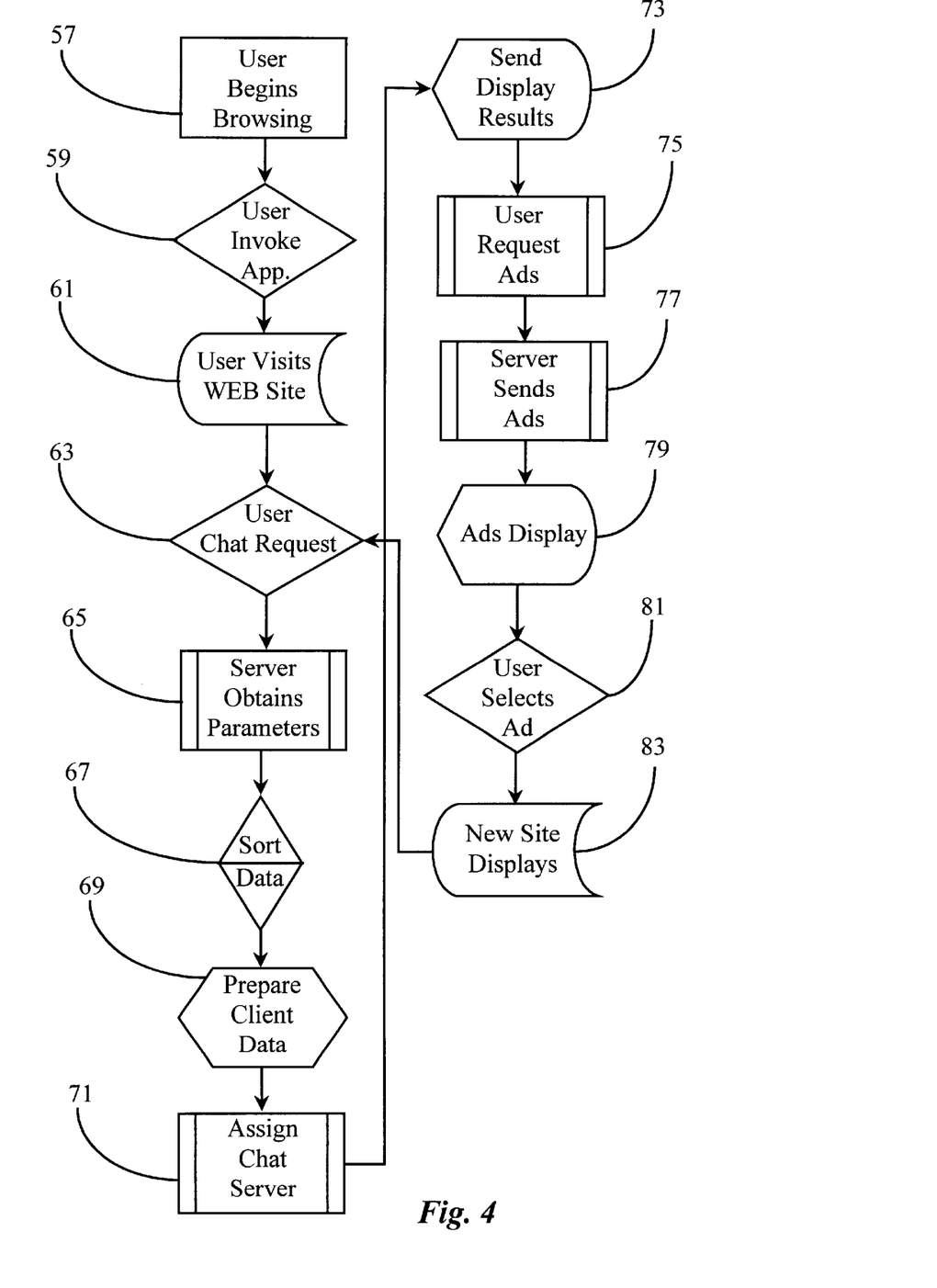
FIG. 4 is a process flow chart illustrating an exemplary client/server interaction process according to an embodiment of the present invention.

FIG. 4 is a process flow chart illustrating an exemplary client/server interaction process according to an embodiment of the present invention. In step 57, a client having software 37 of FIG. 1 configured to his or her WEB browser begins browsing the Internet. Software 37 may be a standalone chat module, a helper application for a client's existing chat program, or a plug-in to the browser. In step 59, a client invokes application 37 by, for example, a button added to normal browser controls. In some cases this step may be automatic when the user loads the browser application with deactivation of software 37 achieved by virtue of configuration settings.

In step 61 a client navigates to a first URL. Enterprise rules will dictate whether or not a URL is automatically reported to a server such as server 17. For example, a certain time minimum may be observed in which it is deemed that a client intends to stay and participate in chat or at least browse a list of visitors. A button may be provided for a client to manually send a URL to server 17 to receive a status report indicating whether or not there are other chatting visitors, and their number. In this example it is assumed that all URL destinations by the client are reported to server 17, and this is reflected as step 62. As previously described, the URL reports are processed at server 17 and used to report back to each browsing client the pool of clients viewing the same page.

Assuming that a client whishes to chat with other clients at the site, he or she will initiate a chat request to server 17 by activating an initiation mechanism in step 63, such as a chat icon or menu item provided in the browser interface by software 37. This request goes to server 17. At step 65 server 17 receives the chat request from a client including client parameters for routing the client into an existing chat session. Client parameters may include a requested URL, the client's IP address (if required), and the client's ID and password information if not already provided or otherwise known before the chat request step (63).

At step 67 server 17 sorts and organizes client data for clearing entry into or routing into an active chat session. This step may include compressing data for faster delivery. At step 69 a routing request is completed and may include additional metadata containing client information acquired from a data repository such as repository 20 of FIG. 1. Such information may be used to verify or confirm passwords, age information, and/or updates of client altered profile information which may be altered for each session.

At step 71, server 17 obtains the IP address (from list) from a chat server that has a matching URL or URL tag listed as indication that a chat session is in progress. In an embodiment wherein server 17 is a high-speed data router, then meta-tags representing client ID and requested URL may be used to route to and establish connection with the appropriate session. The actual URL may be pre-associated with an IP address of the appropriate chat server such as one of servers 55a–h of FIG. 3, and routed to the session having the matching URL or URL Tag.

It is important to note here that if a URL and client identification has been sent to server 17 in step 61 prior to a chat request, then the client's parameters may be made available (ahead of time) to other client's as a listed visitor not engaged in chat. A client may have the option to turn off this feature and may only be visible to other clients if he is actually accepted into a chat session.

At step 73, display results associated with the chat session are sent to the client such as any customized chat page, any additional temporary controls, statistical information, expired chat transcripts or archives, and so on. If a client desires to see ads that may be streamed (in some embodiments) into the active session, then a temporary control may be used to request the ads. An ad server such as server 21 of FIG. 1 may be used to stream ads to a session. Such ads may be viewed by and are accessible to clients by virtue of interaction with a pointer device or other set of controls.

At step 79 ads display according to enterprise rules in a window adapted for the purpose, or on a chat page itself, or perhaps, even in a section of a common URL page if the chat is site-controlled. If a client decides to interact with a displayed ad, then he may select the desired ad with a pointer device or other control method and launch a new URL containing information related to the ad such as on-line order forms, more detailed information about the ad, or other content related to the ad. In one embodiment, a client invoking an ad may continue browsing without losing his chat connection. In another embodiment, a new page may be associated with another level of viewers and chatters. If so, a client may elect to stay in his current chat or leave and join the new chat at the new URL. If he decides to engage in chat at the new location, he initiates a new chat request at step 63.

It will be apparent to one with skill in the art that the steps illustrated in this example may be provided in altered order, and different descriptions without departing from the spirit and scope of the present invention. For example, steps 65 through 71 may be condensed into one logical step or process. Step 61 may be taken before step 59. Steps may vary according to varied client activity. There are many variable interaction possibilities. The inventor intends that the steps illustrated above be construed as exemplary only of one possible client server interaction process.

It will also be apparent to one with skill in the art that service network 9 may be implemented strictly in a business sense where ads are streamed, a recreational sense where no ads are streamed, or in a combination of both. Service network 9 may be practiced on the public Internet, a private or corporate WAN, or in a combination network.

In a further embodiment of the present invention the service-control server 17 or equivalent maintains records of Internet sites visited and reported by clients and organizes statistics based on the historical records. In various embodiments the statistics are made available to commercial participating Internet sites and to clients. It will be apparent to the skilled artisan that such statistics will have many uses.

There are, in various embodiments of the invention a number of features considered by the inventors to be new and non-obvious in addition to those described herein above. These include:

- The plug-in supports all standard chat-client features. This includes buddy lists, messaging another user, indicating emotions or actions, using macros, ignoring users, private discussions, whispering, and the like.
- The plug-in auto-updates itself Periodically, the plugin will check to see if a newer version of the plug-in is available from the central server, and if so, it will silently update itself without requiring user intervention.
- The plug-in is foreign language friendly, and is not limited to English alone. It supports Unicode, multi-byte character strings, bi-directional text, various input method editors, etc.
- The plug-in supports a fully scriptable interface. It is accessible through JavaScript, VBScript, and the like as part of the DOM. It fires events when incoming text arrives and lets a page provide its own interface for the chat session.
- Chats on Intranets stay within the internal network. The plug-in detects that a URL is an Intranet address and does not forward it to a central server. However, if the company decides to install a central server of its own, the plug-in may be configured so that all Intranet chats goes to that company's central server and all external chats go to the global central server.
- Users can tell the plug-in to stop sending its URLs. Sometimes a user doesn't want to see their URLs transferred anywhere. They can easily toggle this in the plug-in so that nothing about their URLs is sent to the central server, nor do they see anything about other users at those URLs. This is to address privacy concerns.
- Optionally, other users may designate a user as 'witty', 'clever', 'profane', etc. Over time, users can develop a reputation that may be accessed by other users online. Comments about users may be stored, and certain profiles of users can be selected for being ignored or paid attention to.
- Users may follow a leader as they move from URL to URL. The leader may elect not to be followed.
- Chat transcripts can be searched and may persist for a period of time.
- Users can indicate what interests they have and what memberships they have. People with reciprocal interests will see the matching persons indicated in their chat. E.g. 'Looking for relationship', 'Member of YMCA', 'Looking for used Toyota for sale'.
- Users may get the plug-in to stay fixed at a certain URL as the user moves the browser to a new URL. This lets users continue a chat session as they continue browsing.
- Users may extensively customize their profiles (e.g. with a thumbnail picture of themselves.)
- The plug-in may add additional protocols to the browser, e.g. chat:. This would take the user to a new URL and open up a chat session there.

It will also be apparent to one with skill in the art that differing architectures may be used to practice the present invention without departing from the spirit and scope of the present invention. For example, server 17 may be a plurality of connected machines dedicated to communicating to and connecting clients to individual ones of a plurality of chat servers. In another embodiment, server 17 may be such as a high-speed data router with server capability. In this embodiment, server 17 may contain or be connected to a processor-operated switch that may route clients to connected chat servers, and then to appropriate chat sessions ongoing within those servers. An array of connected ad servers may be connected to each chat server according to an established scheme such that appropriate ads go to appropriate servers. One ad server may be used to broadcast ads to all chat servers over a suitable data line. There are many possible embodiments, many of which have been described above. The method and apparatus of present invention should be afforded the broadest scope. The spirit and scope of the present invention is limited only by the claims that follow.

What is claimed is:

1. A site-sensitive service system in a wide-area network (WAN), comprising:
   an enhanced browser extension executing on at least a first and second client platform and accessing the WAN;
   a service-control server in the WAN; and
   an ad server connected to the WAN;
   wherein the enhanced browser extension opens a first communication link to a first WAN-connected site and at least a second communication link to the service-control server, and reports the address of the first WAN-connected site to the service-control server, and wherein the service-control server, recognizing that the client platforms are accessing the same WAN-connected site, enables a chat session between the at least first and second client platforms, and wherein the service-control server also selects ad information based on association of the URL of the Wan-connected site and ad characteristics, and streams the information to the at least first and second client platforms.

2. The system of claim 1 wherein the WAN is the Internet.

3. The system of claim 1 wherein the information streamed to the first client platform comprises identities of additional clients concurrently connected to the first WAN-connected site.

4. The system of claim 3 wherein the service-control server initiates a chat session among client platforms having a connection to the first WAN-connected site as reported by respective enhanced browser extensions at the client platforms.

5. The system of claim 4 wherein the service control server is connected to multiple chat servers for organization and control of chat sessions.

6. The system of claim 1 wherein the information streamed to the client platform is transparent to a host of the first WAN-connected site.

7. The system of claim 6 wherein the information streamed to the client platform includes advertisements hosted by entities other than a host of the first WAN-connected site.

8. The system of claim 1 wherein the information streamed to the client platform is controlled by a host of the first WAN-connected site.

9. The system of claim 8 wherein the service-control server initiates a chat session among client platforms having a connection to the first WAN-connected site as reported by respective enhanced browser extensions at the client platforms.

10. The system of claim 1 wherein multiple client platforms employing enhanced browser extensions report their individual browsing activities by address to the service-control server, and the service control server maintains statistics on sites visited by clients.

11. A method for providing selected information by a service-control server to client platforms in a wide-area-network (WAN), comprising steps of:
   (a) reporting browsing destinations to the service-control server by enhanced browser extensions executing on at least a first and second client platform;
   (b) listing in the service-control server client platforms accessing common WAN destinations;
   (c) streaming information to the at least first and second client platforms based on the lists of client platforms accessing the common destinations; and
   (d) streaming ads to the at least first and second client platforms based on the lists of client platforms accessing the common destinations and association of URL's and ad characteristics.

12. The method of claim 11 wherein the WAN is the Internet.

13. The method of claim 11 wherein the information streamed to the client platforms comprises identities of additional client platforms concurrently connected to the common destinations.

14. The method of claim 13 wherein the service-control server initiates a chat session among the client platforms having a common connection to a WAN destination as reported by respective enhanced browser extensions at the client platforms.

15. The method of claim 11 wherein the information streamed to the client platform is transparent to a host of the common destination.

16. The method of claim 15 wherein the information streamed to the client platform includes advertisements hosted by entities other than the host of the common destination.

17. The method of claim 11 wherein the information streamed to the client platform is controlled by a host of a common destination.

18. The method of claim 17 wherein the service-control server initiates a chat session among client platforms having a connection to a common destination as reported by respective enhanced browser extensions at the client platforms.

19. The method of claim 11 wherein the service control server maintains statistics on sites visited by clients.

20. A enhanced Internet browser application, comprising:
   a first capability for accessing an Internet-connected WEB page through a URL, and for displaying the WEB page;
   a second capability for opening an additional communication link to a service-control server, and for reporting the URL of the WEB page to the service-control server;
   a capability for receiving and selectively displaying information streamed from the service-control server based on the URL reported; and
   a capability of receiving and selectively displaying ads selected by a service-control server based on association of URL's and ad content, and streamed by the service control server.

21. The browser application of claim 20 wherein the information streamed comprises identities of client platforms executing browser applications concurrently visiting the WEB page.

22. The browser application of claim 21 wherein the service-control server initiates a chat session among client platforms having a connection to the WEB page as reported by respective enhanced browser applications at the client platforms.

23. The browser application of claim 22 wherein the application opens an extended window to the browser window for the chat session.

24. The browser application of claim 20 wherein the information streamed to the client platform is controlled by a host of the WEB page through the service control server.

25. A service-control server on the Internet, comprising:
   a capability for logging URLs visited by multiple clients, and grouping clients by active URL site visitation;
   a capability for streaming information to clients based on the active URL sites logged; and
   a capability for selecting ads based on association of active URL's logged and ad characteristics, and streaming the ads to client platforms.

26. The server of claim 25 wherein the information streamed to an individual client comprises identification of other clients visiting the common URL site.

27. The server of claim 25 further comprising a capability for initiating a chat session among clients visiting a common URL site.

28. The server of claim 25 wherein the information streamed to clients is transparent to a host of the common URL site.

29. The server of claim 28 wherein the information streamed to the client platform includes advertisements hosted by entities other than a host of the common URL site.

30. The server of claim 25 wherein the information streamed to the client platform is controlled by a host of the common URL site.

31. The server of claim 30 wherein the server initiates a chat session among clients having a connection to the common URL site.

32. The server of claim 25 wherein the server maintains statistics on sites visited by clients.

33. A browser plug-in for an Internet browser application, comprising:
   a first capability for opening, in addition to any communication links established by a browser using the plug-in, an additional communication link to a service-control server, and for reporting the URL of any WEB page accessed by the using browser to the service-control server;
   a second capability for receiving and selectively displaying information streamed from the service-control server based on the URL reported; and
   a capability of receiving and selectively displaying ads selected by a service-control server based on association of URL's and ad content and streamed by the service control server.

34. The browser plug-in of claim 33 wherein the information streamed comprises identities of client platforms executing browser applications concurrently visiting the WEB page.

35. The browser plug-in of claim 34 wherein the service-control server initiates a chat session among client platforms having a connection to the WEB page as reported by respective enhanced browser applications at the client platforms.

36. The browser plug-in of claim 35 wherein the application opens an extended window to the browser window for the chat session.

37. The browser plug-in of claim 36 wherein the client platform maintains a list of frequent communicants, and the extended window includes a user-initiation for sending an alert to all or individual ones of the list of frequent communicants, the alert identifying the URL currently the focus of the browser application.

38. The browser plug-in of claim 33 wherein the information streamed to the client platform is controlled by a host of the WEB page.

* * * * *